United States Patent Office 3,606,299
Patented Sept. 20, 1971

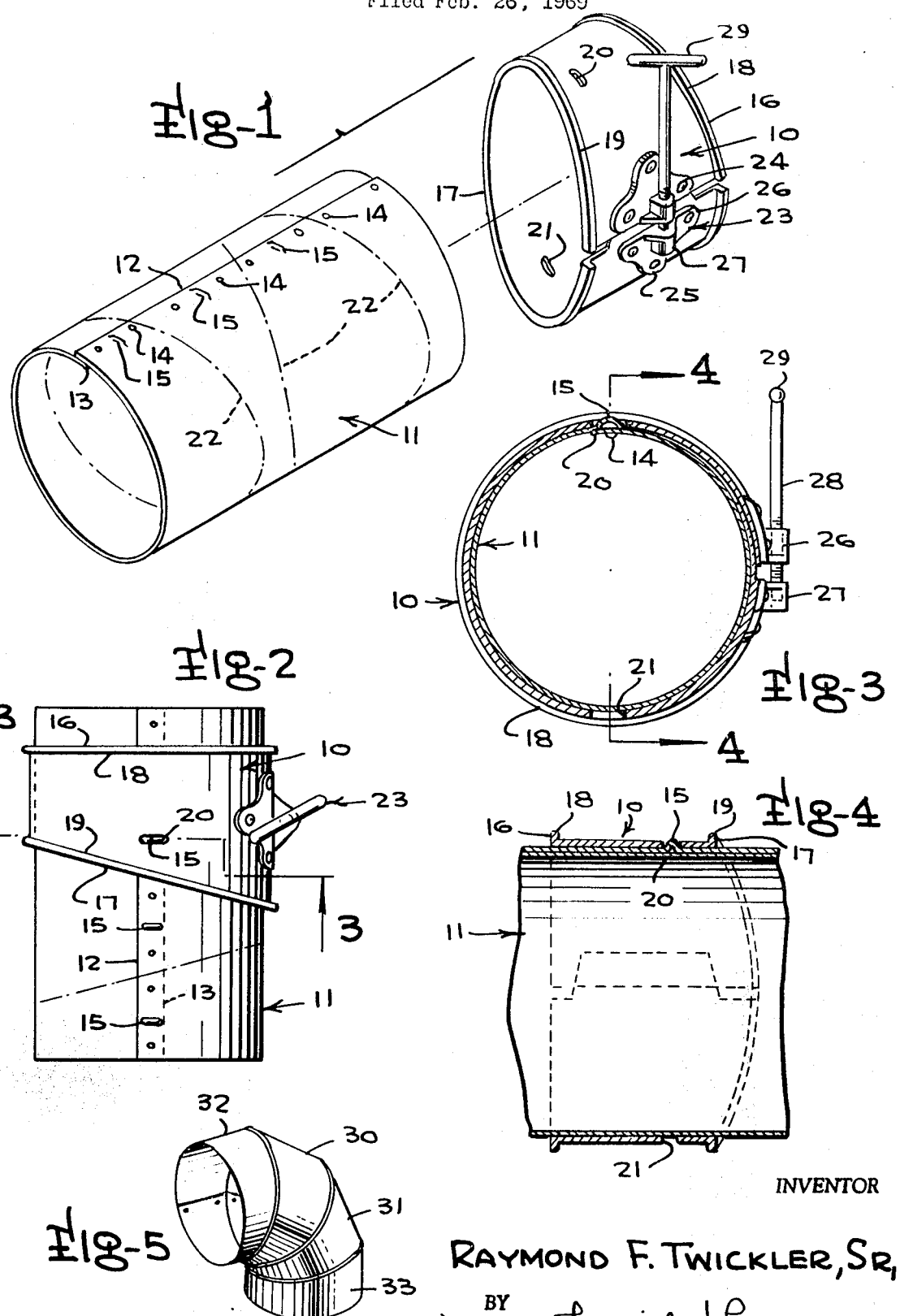

3,606,299
JIG DEVICE
Raymond F. Twickler, Sr., 65 Sedgefield Drive,
Harahan, La. 70123
Filed Feb. 26, 1969, Ser. No. 802,593
Int. Cl. B25b 5/00
U.S. Cl. 269—2                                       1 Claim

ABSTRACT OF THE DISCLOSURE

A jig suitable for use with a workpiece having alignment means including means mountable on the workpiece, and the mountable means having means for guiding working means along the workpiece, means cooperable with the alignment means of the workpiece to position the guide means relative to the workpiece and means for detachably securing the mountable means on the workpiece.

---

This invention relates to a jig and more particularly to a jig suitable for use in cutting a tubular conduit.

Air distribution systems normally utilized in conventional building structures, generally are made up of a plurality of tubular conduits connected together in end to end relation. Usually, such tubular conduits are fabricated of sheet metal in straight and right angle configurations.

In conventional practice, tubular conduits having right angle configurations, commonly referred to as elbows, are fabricated from tubular pieces of sheet metal by forming conduit sections having side edges disposed at various angles to the axes of the tubular pieces, and securing such sections together in end to end relation. Such practice necessitates the accurate cutting of the elbow sections to form an assembled elbow of proper dimension. It has been found, however, that conventional methods utilized in the prior art for cutting elbow sections are unsatisfactory.

Accordingly, it is the principal object of the present invention to provide a device adapted to facilitate the fabrication of conduits for conducting gases.

Another object of the present invention is to provide a novel device which is adapted to facilitate the fabrication of conduits having right angle configurations, commonly referred to as elbows.

A still further object of the present invention is to provide a novel device mountable on a workpiece on which a predetermined operation is to be performed, which is adapted to guide a working means for performing the predetermined operation.

Another object of the present invention is to provide a novel jig.

A further object of the present invention is to provide a novel jig adapted for use with conduits.

A still further object of the present invention is to provide a novel jig mountable on a tubular conduit which is adapted to facilitate the cutting of the tubular conduit.

Another object of the present invention is to provide a novel jig adapted for use in cutting tubular conduits into component sections suitable for use in fabricating conduits having right angle configurations, commonly referred to as elbows.

Other objects and advantages of the present invention will become more apparent to those persons having ordinary skill in the art to which the invention pertains, from the following description taken in conjunction with the accompanying drawing, wherein:

FIG. 1 illustrates a perspective view of an embodiment of the invention;

FIG. 2 is a top plan view of the embodiment illustrated in FIG. 1;

FIG. 3 is a cross-sectional view taken along line 3—3 in FIG. 2;

FIG. 4 is a cross-sectional view taken along line 4—4 in FIG. 3; and

FIG. 5 is a perspective view of an end product formed of sections fabricated with the use of the embodiment illustrated in FIGS. 1 through 4.

Briefly described, the present invention relates to a jig for cutting a tubular conduit member having at least one alignment protuberance, generally comprising a split cylindrical mounting member mountable on the tubular conduit member. The mounting member is provided with a first guide edge for a working tool, disposed in a plane lying perpendicular to the longitudinal centerline thereof, and a second guide edge lying in a plane disposed at an angle to the longitudinal centerline thereof. The mounting member further is formed with at least one depression or aperture for receiving the protuberance in the tubular conduit member to position the mounting member and, correspondingly, the guide edges thereof relative to the conduit, and is provided with a threaded fastener assembly operatively interconnecting the free end portions of the mounting member for rigidly securing the mounting member on the conduit when the mounting member has been aligned relative to the conduit.

Referring to the drawing, there is illustrated an embodiment of the invention. The embodiment includes cylindrical mounting member 10 which is adapted to be mounted on a tubular conduit member 11 to provide guide edges for cutting the conduit member 11 into component elbow sections for forming an elbow, as illustrated in FIG. 5. The tubular conduit member 11 is formed by overlapping a pair of edges 12 and 13 of a rectangular piece of sheet metal and securing the overlapping edges together by means of a plurality of rivets 14 in the conventional manner. Prior to the forming of the conduit member 11, the piece of sheet metal is provided with a plurality of longitudinally spaced upstruck portions or protuberances 15 which will lie along the seam of the tubular conduit member when it is formed from the rectangular piece of sheet metal. The configurations of the protuberances 15 may be of any suitable form.

The cylindrical mounting member 10 is formed as a split band having a pair of opposed guide edges 16 and 17. The guide edge 16 substantially is disposed in a plane perpendicular to the axis of the mounting member and is provided with a peripheral bead or flange 18. The guide edge 17 is disposed in a plane at an angle relative to the axis of the mounting member 10 and similarly is provided with a bead or flange 19 about the periphery thereof. The mounting member 10 also is provided with a pair of diametrically opposed depressions or apertures 20 and 21 which are adapted to receive the upstruck portions or protuberances 15 of the conduit member 11 when the mounting member 10 is mounted on the conduit member, to position the mounting member on the conduit member and, correspondingly, to position the guide edges 16 and 17 on the conduit member along prospective cutting lines, such as along cutting lines 22.

The mounting member 10 is adapted to be rigidly secured on the tubular conduit member by means of a threaded fastener assembly 23 operatively interconnecting the free ends of the mounting member. The threaded fastener assembly includes a pair of mounting plates 24 and 25, mounted on the free ends of the mounting member, having a pair of outwardly projecting portions 26 and 27. The projecting portions 26 and 27 are provided with aligned, oppositely threaded openings for receiving the threaded portion of a shank 28 therethrough. The threaded portion of the shank has oppositely inclined threads, so that when the shank is turned by means of a handle 29, the mounting member will be caused to expand or contract.

In the use of the embodiment illustrated in FIGS. 1 through 4 to form an elbow section 30 or 31, the mounting member 10 is mounted on conduit member 11, so that an upstruck portion or protuberance 15 is registered and received within an aperture 20 or 21. With the mounting member thus in position and the guide edge 17 aligned with a prospective cutting line 22, the handle 29 is turned manually to clamp the mounting member on the tubular conduit member. The entire assembly then is placed in a conventional sheet metal working machine and the tubular conduit member is cut and beaded by guiding the cutting and beading rolls of the machine along the guide edge 17. When one edge of the elbow section 30 or 31 has been formed, the mounting member 10 is removed and remounted in the reverse position wherein the upstruck portion or protuberance 15 is registered and received within the other of the apertures 20 and 21. The mounting member is then rigidly clamped to the tubular conduit member by turning the handle 29. The entire assembly is placed in the machine again and the tubular conduit member is cut and beaded by guiding the cutting and beading rolls of the machine along the guide edge 17.

To form the elbow sections 32 and 33, a similar procedure is followed, although both guide edges 16 and 17 are used to provide elbow sections having one edge lying in a plane perpendicular to the axis thereof, and another edge lying in a plane disposed at an angle to the axis of the section. The finished elbow as illustrated in FIG. 5 is fabricated by positioning the edges of successive sections together and securing the sections together with the use of closing rolls provided on the sheet metal working machine.

Although the embodiment as illustrated discloses guide edges lying in planes disposed approximately 75° and 90° relative to the axis thereof, it will be appreciated that the guide edges can be set at any desired angle. Furthermore, although rectilinear guide edges are disclosed in the embodiment, it will be appreciated that guide lines of various configurations may be utilized within the scope of the invention.

The invention as described, eliminates the requirement of any extensive skill in forming the component sections of an elbow as illustrated in FIG. 5. With the use of the invention, a workman of average skill need only make certain that the cooperating alignment means on the mounting member and the conduit member are in alignment to position the guide edges for cutting the tubular conduit member along the appropriate lines. It thus will be obvious that the use of the invention will result in a saving of time and material.

Having thus described an embodiment of my invention, I claim:

1. A jig for working a tubular workpiece having at least one alignment protuberance comprising a split band mountable on said workpiece, said split band having a first guide edge for a working tool disposed in a plane lying perpendicular to the longitudinal centerline thereof and a second edge lying in a plane disposed at an acute angle to the longitudinal centerline thereof, at least one depression for receiving said protuberance therein to position said split band and correspondingly said guide edges relative to said workpiece and a threaded fastener operatively interconnecting the end portions of said split bands for rigidly securing said split band on said workpiece when said split band has been aligned relative to said workpiece.

References Cited
UNITED STATES PATENTS

| | | | |
|---|---|---|---|
| 4,724,185 | 3/1903 | Hughes | 269—2 |
| 2,155,705 | 4/1939 | Gottwald | 269—2 |
| 2,674,911 | 4/1944 | Theis | 269—131 |
| 3,129,000 | 4/1964 | Casson | 269—2 |

WILLIAM S. LAWSON, Primary Examiner

U.S. Cl. X.R.

269—87.1, 288